United States Patent

Petershofer et al.

[11] Patent Number: 5,876,818
[45] Date of Patent: Mar. 2, 1999

[54] PLASTIC-PAPER COMPOSITE IN FOIL-FORM AND ITS USE FOR PRODUCING WEATHERPROOF LAMINATED SHEETS WITH SURFACE PROTECTION

[75] Inventors: Georg Petershofer, Wiener Neudorf; Michael Horvath, Wien, both of Austria

[73] Assignee: ISOVOLTA Osterreichische Isolierstoffwerke Aktiengesellschaft, Austria

[21] Appl. No.: 647,892

[22] PCT Filed: Oct. 4, 1995

[86] PCT No.: PCT/AT95/00190

§ 371 Date: Aug. 19, 1996

§ 102(e) Date: Aug. 19, 1996

[87] PCT Pub. No.: WO96/11118

PCT Pub. Date: Apr. 18, 1996

[30] Foreign Application Priority Data

Oct. 7, 1994 [AT] Austria .................................. 193/94

[51] Int. Cl.$^6$ .................. B32B 7/06; B32B 27/08; B32B 27/10; B32B 27/36
[52] U.S. Cl. .................. 428/41.7; 428/41.8; 428/202; 428/480; 428/483; 428/511; 428/512; 428/513; 428/514; 428/515; 428/516; 428/520; 428/522; 428/523; 428/216; 428/339; 428/340; 156/230; 156/235; 156/247; 156/289; 156/307.3; 156/307.4; 156/307.7
[58] Field of Search .................. 428/40.1, 41.3, 428/41.5, 41.7, 41.8, 480, 481, 483, 507, 511, 512, 513, 514, 515, 516, 520, 522, 523, 202, 203, 207; 156/230, 235, 237, 238, 288, 289, 307.1, 307.3, 307.4, 307.7, 247

[56] References Cited

U.S. PATENT DOCUMENTS

| Re. 28,682 | 1/1976 | Hoey .................. 428/196 |
| 3,912,569 | 10/1975 | Kapral .................. 156/230 |
| 3,929,545 | 12/1975 | Van Dyck et al. .................. 156/220 |
| 4,343,855 | 8/1982 | Conder .................. 428/332 |
| 4,789,604 | 12/1988 | van der Hoeven .................. 428/503 |
| 4,971,854 | 11/1990 | Hinishi et al. .................. 428/195 |
| 5,019,198 | 5/1991 | Schafer et al. .................. 156/230 |
| 5,266,384 | 11/1993 | O'Dell et al. .................. 428/207 |
| 5,466,511 | 11/1995 | O'Dell et al. .................. 428/207 |
| 5,494,885 | 2/1996 | Kudo et al. .................. 503/227 |

FOREIGN PATENT DOCUMENTS

| 216 230 | 4/1987 | European Pat. Off. . |
| 2 745 939 | 12/1978 | Germany . |
| 88/01575 | 3/1988 | WIPO . |
| 90/14226 | 11/1990 | WIPO . |
| 91/19610 | 12/1991 | WIPO . |

*Primary Examiner*—Vivian Chen
*Attorney, Agent, or Firm*—Bacon & Thomas, PLLC

[57] ABSTRACT

The invention concerns a plastics-paper composite which substantially consists of a paper layer, a polypropylene layer and a polyester layer, the polyester layer forming one of the two surface layers of the plastics-paper composite. This plastics-paper composite is used to produce weatherproof laminated sheets with surface protection, an acrylate layer being applied to the polyester layer of the plastics-paper composite. This composite is stacked on one or both sides with a plurality of papers impregnated with synthetic resin to form a stack, the acrylate layer lying against the outermost paper layer(s). This stack is then pressed at high pressure and high temperature. For use, the surface protection is removed from the acrylate layer as from the polyester layer.

14 Claims, 2 Drawing Sheets

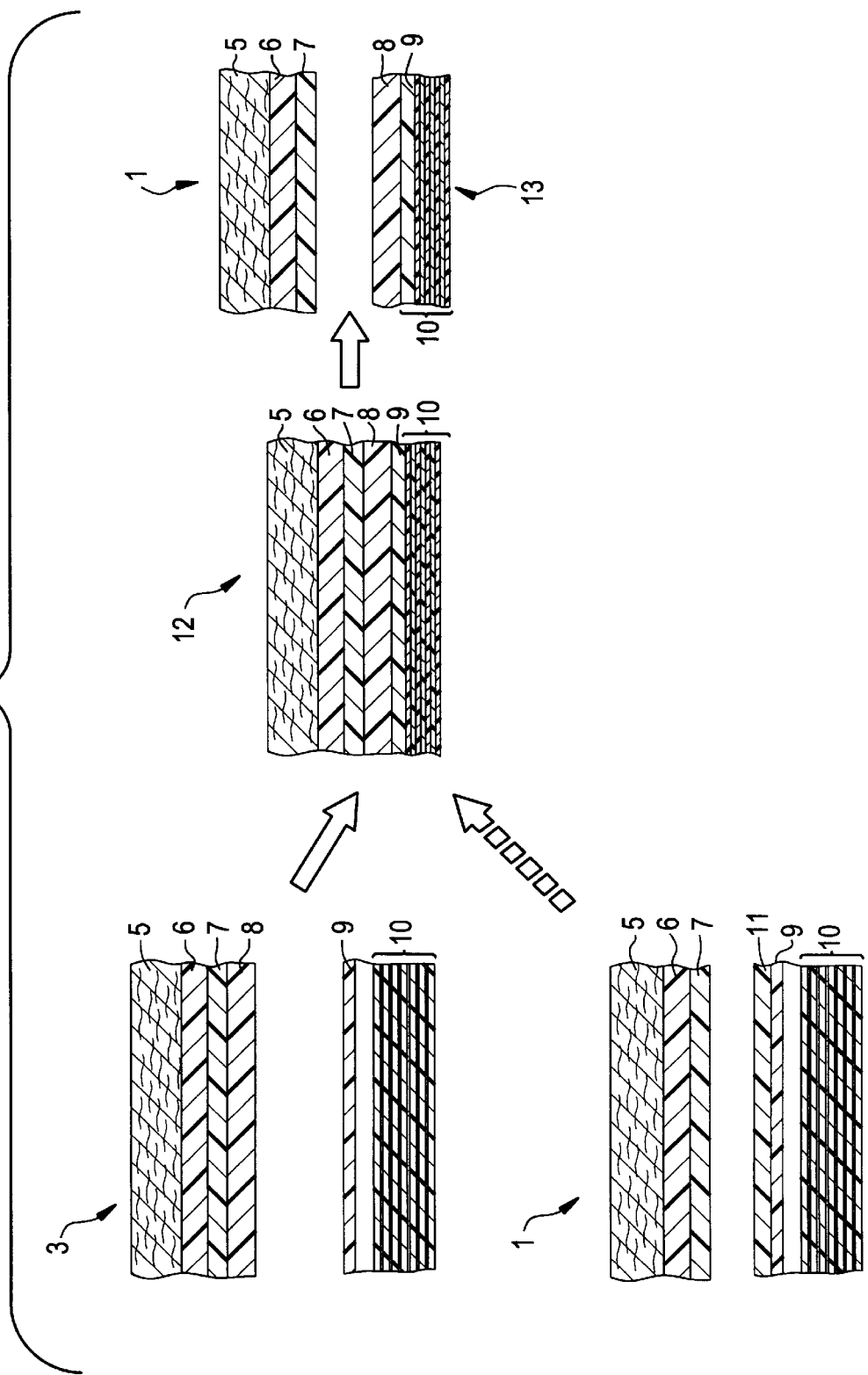

PLASTIC-PAPER COMPOSITE IN FOIL-FORM AND ITS USE FOR PRODUCING WEATHERPROOF LAMINATED SHEETS WITH SURFACE PROTECTION

This application is a 371 of PCT/AT95/00190, filed Oct. 4, 1995.

BACKGROUND OF THE INVENTION

The invention relates to a plastic-paper composite in foil form as well as its use for producing weatherproof laminated sheets with surface protection.

DESCRIPTION OF RELATED ART

Laminated sheets are produced by compressing a stack comprised of a quantity of resin-covered paper strips. A decorated paper strip impregnated with melamine resin is placed on one of the two surfaces of a stack that is made up, for example, of several papers impregnated with phenol resin, and is then compressed with it. As a result of this measure, the laminated sheet is provided with a very hard, scratch-proof, strong decorated surface.

These decorated laminated sheets are used indoors for manufacturing furniture, but can be used outdoors as well. In outdoor use, however, it has been found that the decorated laminated sheets tend to get scratched off, whereby the visual appearance of the cover is considerably impaired.

It has long been an object, therefore, to produce decorative laminated sheets for outdoor use that are weatherproof. Thus, weather protection can be provided in the form of a lacquer layer or a foil. Preferred materials are those based on acrylic resins which make durable weatherproofing possible. By using acrylic resin lacquer for producing the weatherproof outer sheets, according to EP-A-281586, one or both outer layers of the stacks consisting of the paper layers impregnated with plastic resin are covered with an acrylic lacquer and then compressed in a press at an increasing pressure and temperature. The acrylic resin lacquer, however, has the disadvantage that steel plates, matrices, or separating papers can adhere to the compression equipment, which leads to the formation of decorative surfaces with unattractive visual qualities.

When using foils with an acrylate base, for example, it has been demonstrated that they are difficult to handle during the compression operation, since they rip easily, wrinkle, and roll up. This often leads to the necessity of using manual assistance, which is costly, and can lead to faulty production processes as well.

It is also known that plastic foils can be used as carrier material for weatherproof lacquers, especially acrylic resin lacquer, which are applied on one or both sides of the stack consisting of paper layers impregnated with synthetic resin, and can be compressed together with them. After the compression operation, the carrier material is peeled off from the acrylic resin sheet, which now forms the weatherproof outer surface of the laminated sheet. Since this arrangement consisting of the carrier material and the acrylic resin sheet is very thin, it is difficult to handle and easily slips off the pressing stack. Additional pattern producers, such as pressing plates or matrices, are needed in order to obtain a decorated surface for the weatherproof laminated sheet. The surface hardness of acrylic resin sheets is also less than that of melamine surfaces, so that during transportation between processes during production, and also when handled by the user, especially during the cutting and mounting of plates of up to 70 Kg, the acrylic resin sheet can be damaged.

The object of the invention is then to provide a plastic-paper combination foil of the type described above that can be used as carrier material for the acrylic sheet provided with weatherproof protection that does not exhibit the known disadvantages, and which serves as a shaper—independent from its function as carrier material—during the pressing operation, and, at the same time, which builds a removable surface protection provided with a weatherproof protection, for example, for transportation.

SUMMARY OF THE INVENTION

According to the invention, a plastic-paper composite is proposed, which is in foil form and is made up of a paper layer, a polypropylene layer, and a polyester layer, and wherein the polyester layer forms one of the two surface layers of the plastic-paper composite.

The plastic-paper composite of the invention is further characterized in that the layers of the plastic-paper composite are connected with one another by means of a non-thermoplastic adhesive which is, to its advantage, an acrylic adhesive.

The plastic-paper composite according to the invention has a polyester layer which is made of polyethylene terephthalate.

Another advantageous feature of the invention of the plastic-paper composite is that the thickness of the polyethylene terephthalate layer is 6 to 100 $\mu$m, preferably 12 to 25 $\mu$m; that the paper used for the paper layer has a weight of 25 to 240 g/m$^3$, preferably 30 to 100 g/m$^3$; and that the thickness of the polypropylene layer is 12 to 100 $\mu$m, preferably 12 to 25 $\mu$m.

The plastic-paper composite according to the invention is further characterized in that it has an acrylate layer on the polyethylene terephthalate layer with a thickness of at least 30 $\mu$m, wherein the acrylate layer is in foil form or in the form of a lacquer layer.

The plastic-paper composite of the invention is used advantageously for producing a weatherproof press plate layer with surface protection.

The invention further refers to a process for producing a weatherproof laminated sheet with surface protection, wherein an acrylic layer is applied over a plastic-paper composite in foil form, so that the foil combinations obtained in this way can be made up, on one or both sides, from several papers impregnated with resin, forming a stack wherein the acrylate layer(s) are applied to the outer paper layer(s); this stack is compressed under pressure and increasing temperature so that a laminated sheet provided with surface protection is obtained that has the plastic-paper composite produced, with the acrylate serving as weatherproof protection applied to one or both outer sides, and the produced laminated sheet of plastic-paper composite that is protected with a surface protection can be peeled from the acrylate layer, thus obtaining a laminated sheet with a weatherproof protection.

A further variation of the process according to the invention consists in producing a weatherproof laminated sheet with surface protection wherein an acrylate layer is applied in the form of a lacquer painted onto the polyester layer of a plastic-paper composite, and this composite is stacked with several papers impregnated with synthetic resin and the acrylate layer(s) lies (lie) on the outer paper layer(s); this stack is compressed under pressure and increasing temperature, so that a laminated sheet provided with surface protection is produced with the plastic-paper composite on which the acrylate layer, which serves as weatherproof protection, is applied on one or both sides, and the layer of the laminated sheet of the plastic-paper composite, which is provided with surface protection, is lined with the acrylate layer so that a laminated sheet provided with weatherproof protection is produced.

In the process for producing weatherproof laminated sheets, the plastic-paper composite functions as a carrier for a weatherproofing outer layer in the form of an acrylate layer with a surface protection according to the invention, and it is also a surface protector against damage to the acrylate layer during, for example, transport of the laminated sheet produced by the compressing operation. Surprisingly, it was found that, during the compression operation, a good adhesion is produced between the polyethylene terephthalate layer and the acrylate layer without its being necessary to use an additional adhesive substance which could come loose during the use of the weatherproof laminated plate; for example, that the hardened polyethylene terephthalate layer could completely come off during mounting.

Furthermore, the plastic-paper composite provides a structure for the surface composition of the decorative layer, so that adding further pattern producers, for example, patterned pressing plates, becomes unnecessary.

The patterning is provided by the thickness and roughness of the paper layer, as well as by means of its fibrousness. If the patterning properties are too high, then an advantageous embodiment permits switching the paper and propylene layers with each other so that the polypropylene layer is closer to the decorated surface.

The invention relates further to a process for producing a weatherproof laminated sheet with surface protection wherein a stack of a quantity of layers of paper impregnated with synthetic resin is built, and one or both outer sides is (are) provided with a lacquer coating on the basis of an acrylate resin, and a plastic-paper composite is applied further on one or both sides of this stack, wherein the polyester layer of the plastic-paper composite lies (lie) on the acrylate layer(s), and this stack is compressed under pressure and increasing temperature so that a surface protection is provided on the laminated sheet, and so that, when using the laminated sheet provided with the surface protection, the acrylate layer is applied to the plastic-paper composite, and a laminated sheet provided with a weatherproof protection is produced.

The plastic-paper composite according to the process of the invention functions as a surface protector and as a pattern producer as well.

DESCRIPTION OF THE FIGURES OF DRAWING

The invention is explained in more detail with reference to FIGS. 1 and 2 as well as Examples 1 through 3.

FIG. 1 shows the plastic-paper composite of the invention according to the variations of FIGS. 1a, 1b, 1c, and 1d.

FIG. 1a shows the plastic-paper composite 1 of the invention comprised by the paper layer 5, the polypropylene layer 6, and the polyethylene terephthalate layer 7.

FIG. 1b shows the plastic-paper composite 2 of the invention comprised of the polypropylene layer 6, the paper layer 5, and the polyethylene terephthalate layer 7.

DETAILED DESCRIPTION OF THE PREFERRED EMBODIMENT

Figure 1A:
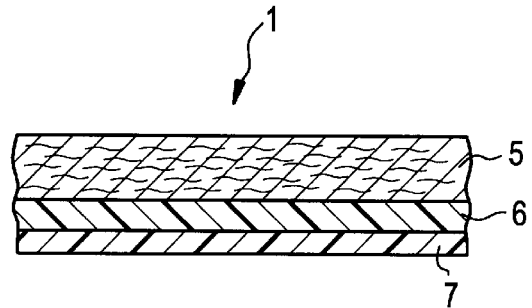
Figure 1B:
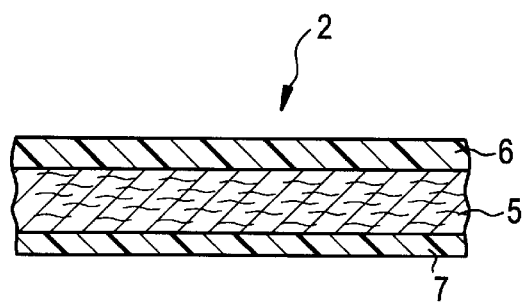
Figure 1C:
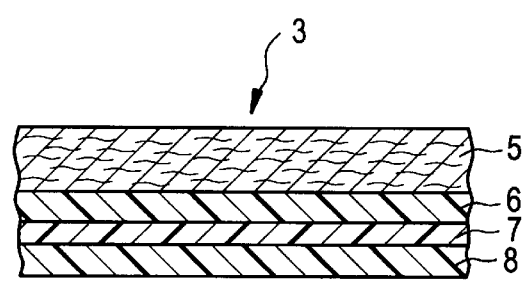

FIG. 1c shows the plastic-paper composite 3 of the invention comprised by a plastic-paper composite according to FIG. 1a wherein an acrylate layer 8 is applied to the polyethylene terephthalate layer 7.

Figure 1D:
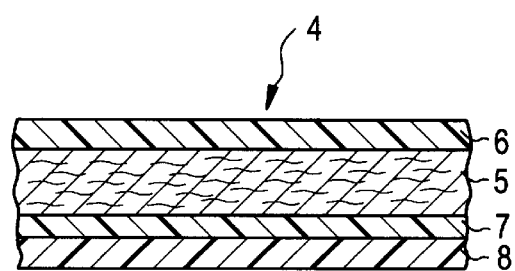

FIG. 1d shows the plastic-paper composite 4 of the invention which is a plastic-paper composite according to FIG. 1b wherein the acrylate layer 8 is applied to the polyethylene terephthalate layer 7.

FIG. 2 shows a schematic representation of the production of a laminated sheet 12 provided with surface protection which can be used to produce a laminated sheet 13 provided with weatherproof protection.

In Examples 1 and 2, further schematics of a plastic-paper composite 3 are shown as well as a decorated layer impregnated with melamine resin or a surface provided with barrier papers 9 and a quantity of papers 10 impregnated with phenol resin for the building of a stack which is used in the production of a laminated sheet 13 provided with a surface protection or weatherproof protection.

Example 3 shows a schematic of the production of 12 from a plastic-paper composite 1 which is compressed with a stack comprised of a decorated layer 9 impregnated with melamine resin provided with an acrylate layer 11 and a quantity of paper strips 10 impregnated with phenol resin to produce a weatherproof laminated sheet with surface protection.

EXAMPLES 1 to 3

EXAMPLE 1

According to a variation of the process of the invention, the weatherproof laminated sheet 12 is provided with surface protection. In the case of its use according to FIG. 2, by removing the composite 1, a laminated sheet 13 provided with weatherproof protection is produced. The process consists of the following process steps:

a) A plastic-paper composite 3 comprised of a paper layer 5 with a thickness of 65 $\mu$m, a polypropylene layer 6 with a thickness of 30 $\mu$m, and a polyethylene terephthalate layer 7 with a thickness of 12 $\mu$m are formed. The layers 5, 6, and 7 are attached to each other by means of a non-thermoplastic adhesive such as an acrylic adhesive. An acrylic foil 8 is applied by extrusion to the polyester terephthalate side 7 of this plastic-paper composite 3 and this extrusion step is carried out without adding adhesive substances; a plastic-paper composite according to FIG. 1a is obtained. The inserted acrylate foil 8 can be colorless if a layer 3 provided with a decoration and impregnated with melamine resin is applied; however, it can itself be a decoration carrier, and the decoration layer 9 in the form of a paper layer impregnated with melamine resin can be omitted.

b) A layered stack is produced in the course of the compression step. The series of layers from pressing plate to pressing plate in this stack is as follows:
Steel plate
Plastic-paper composite 3
(Decorated paper or barrier paper 9 impregnated with melamine resin)
Core paper layers 10 impregnated with phenol resin
(Decorated paper or barrier paper 9 impregnated with resin)
Plastic-paper composite 3
Steel plate
Layers 9 can be omitted from the stack when using a decorated acrylate foil.

c) The layered stack produced in process step b) is guided into a high-pressure press.

d) The layered stack produced according to step b) is compressed at a temperature of 130° to 150° C. at a pressure of about 70 bar, so that the synthetic resin hardens the paper strips and, at the same time, the plastic-paper composite 3 adheres by means of the acrylate layer to the paper layer impregnated with the synthetic resin and is fixed thereon.

e) The composite processed according to step d), which is in the form of a weatherproof laminated sheet 12 provided with surface protection is cooled at room temperature and guided into a high-pressure press.

f) The laminated sheet 12 is trimmed, smoothed, and cut into the desired shape, and can be stored or delivered for further processing.

g) In a further processing step of the laminated sheet 12, the plastic-paper composite 1 is peeled from the acrylate layer 8 so that the laminated sheet 13 provided with a weatherproof protection is produced.

EXAMPLE 2

Process step a)

A plastic-paper composite 1 is applied to the polyethylene terephthalate layer 7 with an acyrlic lacquer coating 8 whereby the plastic-paper composite 3 is processed according to FIG. 1c. The process steps b) to g) are carried out as in Example 1.

EXAMPLE 3

Process step a)

A quantity of paper strips impregnated with synthetic resins are stacked one on top of another, and the outer layer, which can be comprised of a core paper layer according to 10 or a decorated paper layer 9 impregnated with melamine resin, is provided with an acrylic resin layer 11.

b) A layered stack is formed in the following order:
Steel plate
Composite 1
Decorated layer 9 impregnated with melamine resin provided with an acrylic resin lacquer coating on core paper layers 10 impregnated with phenol resin
Decorated paper 9 impregnated with melamine resin provided with an acrylic resin lacquer layer
Composite 1
Steel plate The process steps c) to g) are carried out as in Example 1.

The examples are considered to be explanatory but not limiting.

The plastic-paper composite of the invention may be used advantageously for the production of a weatherproof laminated sheet with surface protection. Weather resistance is achieved by an acrylic layer. The surface protection is represented by the plastic-paper composite of the invention so that the weatherproof laminated sheet provided with the acrylate layer is protected against damage caused, for example, during transportation.

We claim:

1. A process for producing a weatherproof laminated sheet with surface protection, comprising:

forming a plastic-paper composite in the form of a foil comprised of a paper layer, a polypropylene layer adjacent to the paper layer and a polyethylene terephthalate layer adjacent to the polypropylene layer such that the polyethylene terephthalate forms one of the two surface layers of the composite;

applying an acrylate layer on the polyethylene terephthalate surface layer;

applying a plurality of synthetic resin impregnated paper strips to the acrylate layer of the plastic-paper composite to form a stack in which the acrylate layer lies in contact with the outer paper strip;

compressing the stack under pressure and heat to produce a laminated sheet with surface protection; and peeling off the plastic-paper composite from the acrylate layer to produce a weatherproof laminated sheet with the acrylate layer serving as weatherproofing for the sheet.

2. The process according to claim 1, wherein the acrylate layer is applied to the plastic-paper composite in the form of a lacquer coating.

3. The process according to claim 1, wherein the layers of the plastic-paper composite are attached to each other by a non-thermoplastic adhesive.

4. The process according to claim 3, wherein the non-thermoplastic adhesive is an acrylate adhesive.

5. The process according to claim 1, wherein the polyethylene terephthalate layer has a thickness to 6 to 100 $\mu$m.

6. The process according to claim 5, wherein the polyethylene terephthalate layer has a thickness of 12 to 25 $\mu$m.

7. The process according to claim 1, wherein the paper used in the paper layer of the plastic-paper composite has a weight of 25 to 240 g/m$^3$.

8. The process according to claim 7, wherein the paper used in the paper layer of the plastic-paper composite has a weight of 30 to 100 g/m$^3$.

9. The process according to claim 1, wherein the thickness of the polypropylene layer in the plastic-paper composite is up to 100 $\mu$m.

10. The process according to claim 1, wherein the thickness of the polypropylene layer in the plastic-paper composite is 12 to 25 $\mu$m.

11. The process according to claim 1, wherein the acrylate layer has a thickness of at least 30 $\mu$m.

12. The process according to claim 1, wherein the acrylate layer is directly applied to the polyethylene terephthalate layer of the plastic-paper composite without adhesive substance.

13. A waterproof laminated sheet with surface protection formed by the process of claim 1.

14. A process for producing a weatherproof laminated sheet with surface protection, comprising:

forming a plastic-paper composite in the form of a foil comprised of a paper layer, a polypropylene layer adjacent to the paper layer and a polyethylene terephthalate layer adjacent to the polypropylene layer such that the polyethylene terephthalate forms one of the surface layers of the composite;

forming a stack of a plurality of synthetic resin impregnated paper strips;

applying an acrylate layer onto the outer surface layer of the stack;

applying the plastic-paper composite to the acrylate layer so that it lies with its polyethylene terephthalate layer in contact with the acrylate layer; and compressing the stack under pressure and heat to produce a laminated sheet with surface protection.

\* \* \* \* \*